United States Patent
Weber et al.

(10) Patent No.: US 6,194,496 B1
(45) Date of Patent: Feb. 27, 2001

(54) FLAME-RESISTANT THERMOPLASTIC MOULDING MATERIALS WITH IMPROVED PROCESSING BEHAVIOR

(75) Inventors: Martin Weber, Maikammer; Joachim Seibring, Freinsheim, both of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/180,293

(22) PCT Filed: May 6, 1997

(86) PCT No.: PCT/EP97/02290

§ 371 Date: Nov. 5, 1998

§ 102(e) Date: Nov. 5, 1998

(87) PCT Pub. No.: WO97/43336

PCT Pub. Date: Nov. 20, 1997

(30) Foreign Application Priority Data

May 9, 1996 (DE) .............................................. 196 18 741

(51) Int. Cl.$^7$ ...................................................... C08K 5/52
(52) U.S. Cl. ........................... 524/127; 524/126; 524/139
(58) Field of Search ................... 524/139, 127, 524/126

(56) References Cited

U.S. PATENT DOCUMENTS

| 2,862,906 | 12/1958 | Stein | 260/45 |
|---|---|---|---|
| 3,383,435 | 5/1968 | Cizek | 260/874 |
| 3,639,508 | 2/1972 | Kambour | 260/876 |
| 3,660,531 | 5/1972 | Lauchlan et al. | 260/876 |
| 3,994,856 | 11/1976 | Katchman et al. | 260/42 |
| 4,128,602 | 12/1978 | Katchman et al. | 260/876 |
| 4,128,603 | 12/1978 | Katchman et al. | 260/876 |
| 4,154,775 * | 5/1979 | Axelrod | 524/120 |
| 4,167,507 | 9/1979 | Haaf | 525/92 |
| 4,233,199 * | 11/1980 | Abolins et al. | 524/139 |
| 4,255,324 * | 3/1981 | Granzow et al. | 524/139 |
| 4,278,588 * | 7/1981 | Granzow | 524/139 |
| 4,293,464 * | 10/1981 | Granzow | 524/139 |
| 4,360,618 | 11/1982 | Trementozzi | 524/141 |
| 4,405,753 | 9/1983 | Deets et al. | 525/68 |
| 4,563,500 | 1/1986 | Haaf et al. | 525/99 |
| 4,618,633 * | 10/1986 | Taubitz et al. | 524/120 |
| 5,741,838 * | 4/1998 | Fuhr et al. | 524/127 |

FOREIGN PATENT DOCUMENTS

| 3234033 | 9/1982 | (DE) . | |
|---|---|---|---|
| 080666 | 6/1983 | (EP) . | |
| 090523 | 10/1983 | (EP) . | |
| 496120 | 1/1991 | (EP) . | |
| 538950 | 4/1993 | (EP) . | |
| 2060656 | 5/1981 | (GB) . | |
| 057207641 | 6/1981 | (JP) . | |
| 62-143960 * | 6/1987 | (JP) | 524/139 |
| 2-187456 * | 7/1990 | (JP) | 524/127 |
| 05025341 | 7/1991 | (JP) . | |
| 4-279660 * | 10/1992 | (JP) | 524/127 |
| 5-25340 * | 2/1993 | (JP) | 524/139 |
| 83/01254 | 4/1983 | (WO) . | |
| 87/00540 | 1/1987 | (WO) . | |

OTHER PUBLICATIONS

Fried et al., *Polym. Eng. Sci.*, 22, 1982, 705–718.
Chem. Abst., vol. 59 (equiv. of Ellers, *Kolloid–Z.*, 190(1), 16–34, 1963.)

* cited by examiner

*Primary Examiner*—Veronica P. Hoke
(74) *Attorney, Agent, or Firm*—Keil & Weinkauf

(57) ABSTRACT

Flame-retardant thermoplastic molding materials containing
A) at least one polyphenylene ether and
B) at least one vinyl aromatic polymer, comprise
C) as a flameproofing agent, a mixture of
   $C_1$) at least one oligophosphonate or oligophosphate compound
   and
   $C_2$) at least one phosphine oxide.

11 Claims, No Drawings

FLAME-RESISTANT THERMOPLASTIC MOULDING MATERIALS WITH IMPROVED PROCESSING BEHAVIOR

The present invention relates to flame-retardant thermoplastic molding materials having improved processing behavior, the use of the novel thermoplastic molding materials for the production of fibers, films and moldings, and the fibers, films and moldings produced using these molding materials.

Polymer blends comprising polyphenylene ether (PPE) and styrene polymers are disclosed, for example, in U.S. Pat. Nos. 3,383,435; 4,128,602 and 4,128,603. Such molding materials are suitable for 15 the production of shaped articles which have better heat distortion resistance than high-impact polystyrenes (HIPS) which are not mixed with polyphenylene ethers. A detailed description of the properties of these polymer blends also appears in L.Bottenbruch, "Technische Polymer-Blends", Kunststoff Handbuch 20 3/2, Hanser Verlag, Munich, 1993.

An important advantage of the polymer blends comprising polyphenylene ethers and styrene polymers is that, by adding halogen-free flameproofing agents, in particular phosphorus-containing compounds, it is possible to prepare molding materials which are flame-retardant and are therefore used for many electrical applications. In particular, testing of the flame-retardance according to UL 94 (in J.Troitzsch, "International Plastics Flammability Handbook", page 346 et seq., Hanser Verlag, Munich, 1990) is decisive for use in the electrical sector. In this test, a flame is applied several times to vertically fastened test specimens. The test specimen heats up to a very great extent, leading in many cases to the dripping of flaming polymer material which ignites the cotton wool positioned under the rod. This undesirable behavior is observed in particular when large amounts of flameproofing agent have to be used to achieve short combustion times.

There is therefore a need for novel, highly effective flameproofing combinations which permit a reduction in the amount of flameproofing agent.

The literature discloses a number of examples where mixtures of different flameproofing agents have led to improvements in the properties of thermoplastic molding materials. For example, JP 57207641 describes PPE/HIPS blends, in which a mixture of resorcinol diphenyl phosphate (RDP) and triphenyl phosphate (TPPA) was used. German Laid-Open Application DE-OS 32 34 033 discloses PPE/HIPS blends which contains synergistic mixtures of phosphine oxides and monophosphates as flameproofing agents. This flameproofing combination permits a reduction in the amount of flameproofing agent, having an advantageous effect on the mechanical properties of the molding materials produced therefrom. However, these molding materials have disadvantages with regard to the processing behavior.

Furthermore, mixtures of phosphorus-containing compounds with nitrogen compounds have been described as flameproofing combinations. For example, JP 05025341 describes a phosphate/melamine mixture which comprises red phosphorus as a further component. Combinations of phosphorus-containing compounds with nitrogen and sulfur compounds are described, for example, in EP 0 496 120. Whereas the first combination leads to an improvement of the fire behavior, the second mixture claimed in EP 0 496 120 also has advantages with regard to coating of the mold. However, such mixtures have disadvantages with respect to toughness.

EP 0 090 523 describes polphenylene ether resins which contain a hydroxyl- and carboxyl-substituted ethylene polymer for improving the toughness of the molding materials. Unsubstituted or substituted triphenyl phosphate is mentioned as a possible flameproofing agent.

EP 0 538 950 describes polymer compositions having improved flameproof properties, the composition comprising, in addition to a copolymer grafted onto rubber, a polymer having hydroxystyrene units. Mono-, di- and oligomeric polyphosphates and metal and metalloid salts of organic phosphoric acid derivatives are mentioned as possible flameproofing agents.

It is an object of the present invention to provide an effective flameproofing combination for thermoplastic molding materials, in particular for thermoplastic molding materials based on polyphenylene ethers and vinyl aromatic polymers, such as HIPS, which combination permits optimization of the properties of the molding material with regard to fire behavior, mechanical properties and processing behavior.

We have found, surprisingly, that this object is achieved with the use of a combination of oligophosphorus compounds and phosphine oxides.

The present invention therefore relates to flame-retardant thermoplastic molding materials based on
A) at least one polyphenylene ether and
B) at least one vinyl aromatic polymer, which comprises,
C) as a flameproofing agent, a mixture of
$C_1$) at least one oligophosphorus compound of the general formula (I) and/or (II)

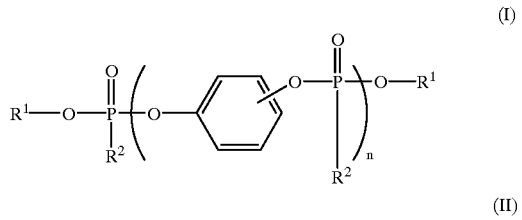

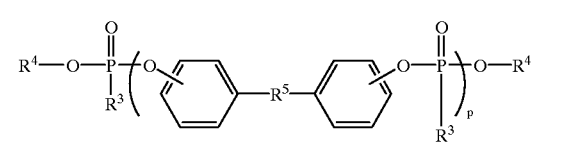

where
$R^1$ and $R^4$, independently of one another, are each unsubstituted or substituted alkyl or aryl,
$R^2$ and $R^3$, independently of one another, are each unsubstituted or substituted alkyl, aryl, alkoxy or aryloxy,
$R^5$ is alkylene, —$SO_2$—, —CO—, —N=N— or —($R^6$)P(O)—, where $R^6$ is unsubstituted or substituted alkyl, aryl or alkylaryl, and
n and p, independently of one another, are each from 1.0 to 30, and
$C_2$) at least one phosphine oxide of the general formula (III)

where $R^7$, $R^8$ and $R^9$, independently of one another, are each hydrogen or unsubstituted or substituted alkyl, aryl, alkylaryl or cycloalkyl of up to 40 carbon atoms.

Suitable substituents in compounds of the formulae (I), (II) and (III) are cyano, hydroxyl, $C_{1-14}$-alkyl and halogen, such as F, Cl, Br and J.

Preferred alkyl radicals are $C_1$–$C_{20}$-alkyl, in particular $C_1$–$C_{12}$-alkyl, e.g. methyl, ethyl, n-propyl, n-butyl, neopentyl, n-hexyl, n-octyl, n-nonyl, n-dodecyl, 2-ethylhexyl, 3,5,5-trimethylhexyl and substituted alkyl radicals, e.g. 5 cyanoethyl.

Preferred aryl radicals are phenyl and naphthyl as well as mono- or polysubstituted radicals, such as tolyl, xylyl, mesityl and cresyl.

Preferred alkylaryl radicals are $C_1$-$C_{20}$-alkylaryl, in particular $C_1$-$C_{12}$-alkylaryl, radicals, the alkyl moiety and aryl moiety being as defined above.

Preferred cycloalkyl groups include $C_3$-$C_{10}$-cycloalkyl, such as cyclobutyl, cyclopentyl, cyclohexyl and cycloheptyl.

Preferred alkoxy radicals are $C_1$-$C_{20}$-alkoxy radicals, the $C_1$-$C_{20}$-alkyl moiety being as defined above.

Preferred aryloxy radicals are those in which the aryl moiety is as defined above.

Preferred alkylene radicals are $C_1$–$C_6$-alkylene, such as methylene, ethylene, propylene and hexylene.

The novel molding materials contain the flameproofing combination, preferably in an amount of from about 1 to about 20% by weight, based on the total weight of the molding material.

If necessary, a polymeric hydroxy compound may additionally be present in an amount which improves the fire behavior.

According to a preferred embodiment of the invention, a molding material is provided, containing A) from about 5 to about 98% by weight of polyphenylene ethers,
B) from about 1 to about 94% by weight of styrene polymers,
C) from about 1 to about 20% by weight of flameproofing combination which comprises
   from about 5 to about 95% by weight of at least one phosphorus compound of the above general formula (I) and/or (II) as component $C_1$
   and
   from about 5 to about 95% by weight of a phosphine oxide of the above general formula (III) as component $C_2$,
D) from about 0 to about 50% by weight of an impact modifier,
E) from about 0 to about 10% by weight of a hydroxyl-carrying polymer
   and
F) from about 0 to about 60% by weight of conventional 10 additives.

Here, the stated contents of $C_1$ and $C_2$ are each based on the total weight of the flameproofing combination.

A flameproofing combination which contains a mixture of resorcinol diphenyl phosphate and/or hydroquinone diphenyl phosphate with triphenylphosphine oxide is particularly preferred.

Phosphate and phosphine oxide are preferably present in a molar ratio of from about 1:9 to about 9:1.

The polyphenylene ethers (component A) contained in the novel molding materials are known per se. The polyphenylene ethers are contained in the novel molding materials in an amount of from about 5 to about 98, preferably from about 15 to about 88, in particular from about 20 to about 82.5% by weight, based on the total weight of the molding material.

These are compounds based on substituted, in particular disubstituted, polyphenylene ethers, the ether oxygen of one unit being bonded to the benzene nucleus of the neighboring unit. 35 Polyphenylene ethers substituted in the 2 and/or 6 position relative to the oxygen atom are preferably used. Examples of substituents are halogen, such as chlorine and bromine, long-chain alkyl of up to 20 carbon atoms such as lauryl and stearyl, and short-chain alkyl of 1 to 4 carbon atoms which preferably has no a tertiary hydrogen atom, e.g. methyl, ethyl, propyl and butyl. The alkyl radicals may in turn be monosubstituted or polysubstituted by halogen, such as chlorine or bromine, or by hydroxyl. Further examples of possible substituents are alkoxy, preferably of 1 to 4 carbon atoms, and phenyl which is monosubstituted or polysubstituted by halogen and/or $C_{1-4}$-alkyl according to the above definition. Copolymers of different phenols, for example copolymers of 2,6-dimethylphenol and 2,3,6-trimethylphenol, are also suitable. Of course, mixtures of polyphenylene ethers may also be used.

Examples of polyphenylene ethers which can be used according to the invention are:
poly(2,6-dilauryl-1,4-phenylene ether),
poly(2,6-diphenyl-1,4-phenylene ether),
poly(2,6-dimethoxy-1,4-phenylene ether),
poly(2,6-diethoxy-1,4-phenylene ether),
poly(2-methoxy-6-ethoxy-1,4-phenylene ether),
poly(2-ethyl-6-stearyloxy-1,4-phenylene ether),
poly(2,6-dichloro-1,4-phenylene ether),
poly(2-methyl-6-phenyl-1,4-phenylene ether),
poly(2,6-dibenzyl-1,4-phenylene ether),
poly(2-ethoxy-1,4-phenylene ether),
poly(2-chloro-1,4-phenylene ether),
poly(2,5-dibromo-1,4-phenylene ether).

Preferred polyphenylene ethers are those which have alkyl radical substituents with 1 to 4 carbon atoms, e.g.:
poly(2,6-dimethyl-1,4-phenylene ether),
poly(2,6-diethyl-1,4-phenylene ether),
poly(2-methyl-6-ethyl-1,4-phenylene ether),
poly(2-methyl-6-propyl-1,4-phenylene ether),
poly(2,6-dipropyl-1,4-phenylene ether) and
poly(2-ethyl-6-propyl-1,4-phenylene ether).

For the purpose of the present invention polyphenylene ethers are also to be understood as meaning those which are modified with monomers, such as fumaric acid, maleic acid, maleic anhydride or citric acid.

Such polyphenylene ethers are described, inter alia, in WO 87/00540.

In particular, polyphenylene ethers which have a weight average molecular weight $M_w$ of from about 8 000 to 70 000, preferably from about 12 000 to 50 000, in particular from about 20 000 to 45 000, are used in the compositions.

This corresponds to a limiting viscosity of about 0.18 to 0.7, preferably from about 0.25 to 0.55, in particular from about 0.30 to 0.50, dl/g, measured in chloroform at 25° C.

The molecular weight distribution is determined in general by means of gel permeation chromatography (0.8×50 cm Shodex separation columns of type A 803, A 804 and A 805 with THF as eluant at room temperature). The polyphenylene ether samples are dissolved in THF under pressure at 110° C., 0.16 ml of 0.25% strength by weight solution being injected.

Detection is carried out in general with a UV detector. The columns were calibrated with polyphenylene ether samples whose absolute molecular weight distributions were determined by a GPC/laser light scattering combination.

The vinylaromatic polymer (component B) is contained in the novel molding materials in amounts of from about 1 to about 94, preferably from about 10 to about 83, in particular from about 15 to about 77.5,% by weight, based on the total weight of the molding material. The component B is a vinyl aromatic polymer which is preferably compatible with the polyphenylene ether used. Both homo- and copolymers of vinyl aromatic monomers of 8 to 12 carbon atoms, which are prepared in the presence of a rubber, are suitable. The rubber content is from about 5 to 25, preferably from about 8 to 17,% by weight.

High-impact polystyrenes or copolymers of styrene and other vinyl 30 aromatic compounds are particularly suitable. Such high impact polystyrenes are generally known as HIPS and for the most part are commercially available. They have a viscosity number (VN) of the hard matrix of from about 50 to about 130, preferably from about 60 to about 90, ml/g (0.5% strength in toluene at 23° C.).

Suitable monovinyl aromatic compounds are styrenes alkylated on the nucleus or side chain. Examples are chlorostyrene, o-methylstyrene, p-methylstyrene, vinyltoluene and p-tert-butylstyrene. However, styrene alone is preferably used.

The homopolymers are generally prepared by the known mass, solution and suspension methods (cf. Ullmanns Enzyklopadie der techn. Chemie, Volume 19, pages 265 to 272, Verlag Chemie, Weinheim 1980). The homopolymers may have weight average molecular weights Mw of from about 3 000 to 300 000, which can be determined by conventional methods.

Examples of suitable comonomers for the preparation of copolymers are (meth)acrylic acid, alkyl (meth)acrylates where the alkyl radical is of from 1 to 4 carbon atoms, acrylonitrile and maleic anhydride and maleimides, acrylamide and methacrylamides and their N,N- and N-alkyl-substituted derivatives where the alkyl radical is of 1 to 10 carbon atoms. Suitable examples of such $C_{1-10}$-alkyl groups include methyl, ethyl, n-propyl and isopropyl, n-butyl, tert-butyl and straight-chain and branched pentyl, hexyl, heptyl, octyl, nonyl and decyl. Depending on their chemical structure, the comonomers are contained in the styrene polymers in different amounts. Miscibility of the copolymer with the polyphenylene ether is decisive with regard to the content of comonomers in the copolymer. Such miscibility limits are known and are described, for example, in U.S. Pat. Nos. 4,360,618, and 4,405,753 and in the publication by J. R. Fried and G. A. Hanna, Polymer Eng. Scie., 22 (1982), 705 et seq. The copolymers are prepared by known processes which are described, for example, in Ullmanns Enzyklopadie der techn. Chemie, Volume 19, page 273 et seq., Verlag Chemie, Weinheim (1980). The copolymers generally have a weight average molecular weight ($M_w$) of from about 10 000 to about 300 000, which can be determined by conventional methods.

According to the invention, high-impact polystyrene is preferably used as component B.

The generally used processes for the preparation of high-impact styrene polymers are mass and solution polymerization in the presence of a rubber, as described, for example, in U.S. Pat. No. 2,694,692, and processes for mass-suspension polymerization as described, for example, in U.S. Pat. No. 2,862,906. Other processes can of course also be used, provided that the desired particle size of the rubber phase is established.

The novel molding materials contain, as flameproofing agent (component C), from about 1 to about 20, preferably from about 2 to about 19, in particular from about 2.5 to about 18,% by weight, based on the total weight of said molding materials, of a flameproofing combination comprising $C_1$: from about 5 to about 95% by weight of a phosphorus compound of the above general formula (I) and/or of the formula (II) and $C_2$: from about 5 to about 95% by weight of a phosphine oxide of the general formula (III), the stated percentages by weight for $C_1$ and $C_2$ each being based on the total weight of component C.

Examples of phosphine oxides (component $C_2$) are triphenylphosphine oxide, tritolylphosphine oxide, trisnonylphenylphosphine oxide, tricyclohexylphosphine oxide, tris-(n-butyl)phosphine oxide, tris-(n-hexyl)phosphin oxide, tris-(n-octyl)phosphine oxide, tris-(cyanoethyl)phosphine oxide, benzylbis(cyclohexyl)phosphine oxide, benzylbisphenylphosphine oxide and phenylbis-(n-hexyl)phosphine oxide. Triphenylphosphine oxide, tricyclohexylphosphine oxide, tris-(n-octyl)phosphine oxide and tris-(cyanoethyl) phosphine oxide are particularly preferably used.

Oligophosphorus compounds suitable according to the invention are obtainable, for example, by reacting bisphenols with triphenyl phosphate. Examples of oligophosphorus compounds (component $C_1$) are resorcinol diphenyl phosphate and hydroquinone diphenyl phosphate. According to the invention oligophosphorus compounds based on bisphenol A or bisphenol S may also be used.

It should be noted that the industrially available products $C_1$ are in each case mixtures of different oligomers or isomers.

Rubber impact modifiers are used as impact modifiers (component D) in amounts of up to about 50, preferably up to about 25, in particular up to about 20,% by weight, based on the total weight of the material.

Natural or synthetic rubbers may be used as component D. In addition to natural rubber, suitable impact modifiers are, for example, polybutadiene, polyisoprene or copolymers of butadiene and/or isoprene with styrene and other comonomers, which have a glass transition temperature of from about –100° C. to +25° C., preferably less than 0° C., determined according to K. H. Illers and H. Breuer, Kolloidzeitschrift 190 (1), 16–34 (1963). Appropriately hydrogenated products may also be used.

Preferred impact modifiers D are block polymers of vinyl aromatics and dienes. Impact modifiers of this type are known. German Published Applications DAS 1,932,234, and DAS 2,000,118 and German Laid-Open Application DOS 2,255,930 describe elastomeric block copolymers having different compositions and comprising vinyl aromatic and diene blocks. The use of appropriately hydrogenated block copolymers, if necessary as a mixture with the unhydrogenated precursor, as impact modifiers is described, for example, in German Laid-Open Applications DOS 2,750, 515, DOS 2,434,848 and DOS 3,038,551, EP-A-0 080 666 and WO 83/01254. The disclosure of the above publications is hereby incorporated by reference.

In particular, vinyl aromatic diene block copolymers comprising blocks which have a hard phase (block type S) and, as the soft phase, a random B/S block comprising diene and vinyl aromatic units may be used according to the invention. The composition may on statistical average be homogeneous or inhomogeneous along the chain.

Such an elastomeric block copolymer suitable according to the invention is obtained by forming the soft phase from a random copolymer of a vinyl aromatic with a diene; random copolymers of vinyl aromatics and dienes are obtained by polymerization in the presence of a polar cosolvent.

A block copolymer which may be used according to the invention can be represented, for example, by one of the following general formulae (1) to (11):

  (1)

  (2)

$$B/S-(S-B/S)_n; \quad (3)$$

$$X-[(S-B/S)_n]_m+1 \quad (4)$$

$$X-[(B/S-S)_n]_m+1; \quad (5)$$

$$X-[(S-B/S)_n-S]_m; \quad (6)$$

$$X-[(B/S-S)_n-B/S]_m+1; \quad (7)$$

$$Y-[(S-B/S)_n]_m+1; \quad (8)$$

$$Y-[(B/S-S)_n]_m+1; \quad (9)$$

$$Y-[(S-B/S)_n-S]_m+1; \quad (10)$$

$$Y-[(B/S-S)_n-B/S]_m+1; \quad (11)$$

where
S is a vinyl aromatic block,
40 B/S is the soft phase comprising a random block of diene and vinyl aromatic units,
X is a radical of an n-functional initiator,
Y is a radical of an m-functional coupling agent and
m,n are natural numbers from 1 to 10.

A block copolymer of one of the general formulae S—B/S—S, X—[—B/S—S]$_2$ and Y—[—B/S—S]$_2$ (meanings of the abbreviations as above) is preferred, and a block copolymer whose soft phase is divided into blocks $$(B/S)_1-(B/S)_2; \quad (12)$$

$$(B/S)_1-(B/S)_2-(B/S)_1; \quad (13)$$

$$(B/S)_1-(B/S)_2-(B/S)_3; \quad (14)$$

where the indices 1, 2 and 3 represent different structures by virtue of the fact that the vinyl aromatic/diene ratio differs in the individual blocks B/S or changes continuously within the limits $(B/S)_1(B/S)_2$ within a block, the glass transition temperature $T_g$ of each part-block being less than 25° C, is particularly preferred.

A block copolymer which has a plurality of blocks B/S and/or S with different molar mass per molecule is also preferred.

A block S which is composed exclusively of vinyl aromatic units may furthermore be replaced by a block B since all that is important overall is that an elastomeric block copolymer is formed. Such copolymers may have, for example, one of the structures (15) to (18)

$$B-(B/S) \quad (15)$$

$$B/S)-B-(B/S) \quad (16)$$

$$B/S)_1-B-(B/S)_2 \quad (17)$$

$$B-(B/S)_1-(B/S)_2. \quad (18)$$

Preferred vinyl aromatics are styrene, o-methylstyrene, vinyltoluene and mixtures of these compounds. Preferred dienes are butadiene, isoprene, piperylene, 1-phenylbutadiene and mixtures of these compounds. A particularly preferred monomer combination comprises butadiene and styrene.

The soft blocks are particularly preferably composed of from about 25 to 75% by weight of styrene and from about 25 to 75% by weight of butadiene. Soft blocks which have a butadiene content of from about 34 to 69% by weight and a styrene content of from about 31 to 66% by weight are particularly preferred.

The amount by weight of the diene in the total block copolymer in the case of the styrene/butadiene monomer combination is from 15 to 65% by weight, and that of the vinyl aromatic component is accordingly from 85 to 35% by weight. Butadiene/styrene block copolymers having a monomer composition comprising from 25 to 60% by weight of diene and from 75 to 40% by weight of vinyl aromatic compound are particularly preferred.

The block copolymers are obtainable by anionic polymerization in an unpolar solvent with the addition of a polar cosolvent. It is thought that the cosolvent acts as a Lewis base with respect to the metal cation. Preferably used solvents are aliphatic hydrocarbons, such as cyclohexane and methylcyclohexane. Preferred Lewis bases are polar aprotic compounds such as ethers and tertiary amines. Examples of particularly effective ethers are tetrahydrofuran and aliphatic polyethers, such as diethylene glycol dimethyl ether. Examples of tertiary amines are tributylamine and pyridine. The polar cosolvent is added to the nonpolar solvent in a small amount, for example from 0.5 to 5% by volume. Tetrahydrofuran in an amount of from 0.1 to 0.3% by volume is particularly preferred. Experience has shown that an amount of about 0.2% by volume is sufficient in most cases.

The copolymerization temperature and the proportion of 1,2 and 1,4 linkages of the diene units are determined by the dose and structure of the Lewis base. The novel polymers contain, for example, from 15 to 40% of 1,2 linkages and from 85 to 60% of 1,4 linkages, based on all diene units.

The anionic polymerization is initiated by means of organometallic compounds. Compounds of the alkali metals, in particular of lithium, are preferred. Examples of initiatiors are methyllithium, ethyllithium, propyllithium, n-butyllithium, sec-butyllithium and tert-butyllithium. The organometallic compound is added as a solution in a chemically inert hydrocarbon. The dose depends on the desired molecular weight of the polymer but is as a rule from 0.002 to 5 mol %, based on the monomers.

The polymerization temperature may be from about 0 to 1300C, preferably from 30 to 100° C.

The volume fraction of the soft phase in the solid is of decisive importance for the mechanical properties. According to the invention, the volume fraction of the soft phase composed of diene and vinyl aromatic sequences is from 60 to 95, preferably from 70 to 90, particularly preferably from 80 to 90,% by volume. The blocks A formed from the vinyl aromatic monomers form the hard phase, their volume fraction being accordingly from 1 to 40, preferably from 10 to 30, particularly preferably from 10 to 20,% by volume.

It should be pointed out that there is no strict agreement 5 between the abovementioned ratios of vinyl aromatic compound and diene, the abovementioned limits of the phase volumes and the composition which arises out of the novel ranges of the glass transition temperature, as they are in each case numerical values rounded to full tens. Rather, any agreement might be merely accidental.

The volume fraction of the two phases can be measured by means of high-contrast electronmicroscopy or solid-state NMR spectroscopy. The amount of the vinyl aromatic blocks can be determined by osmium degradation of the polydiene content by precipitation and weighing. The future phase ratio of a polymer can also be calculated from the amounts of monomers used, if polymerization is allowed to go to completion each time.

The block copolymer is uniquely defined for the purposes of the present invention by the quotients of the volume fraction as a percentage of the soft phase formed from the B/S blocks and the proportion of diene units in the soft phase, which is from 25 to 70% by weight for the styrene/butadiene combination.

The glass transition temperature (Tg) is influenced by the random incorporation of the vinyl aromatic compounds in the soft block of the block copolymer and the use of Lewis bases during the polymerization. The glass transition temperature of the total copoylmer is preferably from –50° C. to +25° C., particularly preferably less than 0° C.

The molecular weight of the S block is preferably from 1000 to 200000, in particular from 3000 to 80000 [g/mol]. Within a molecule, S blocks may have different molar masses.

The molecular weight of the B/S block is usually from 2000 to 250000, preferably from 5000 to 150000 [g/mol].

As in the case of block S, block B/S too, may assume different molecular weights within a molecule.

The coupling center X is formed by reacting the living anionic chain ends with a bifunctional or polyfunctional coupling agent. Examples of such compounds are to be found in U.S. Pat. Nos. 3,985,830, 3,280,084, 3,637,554 and 4,091,053. For example, epoxidized glycerides, such as epoxidized linseed oil or soya bean oil, are preferably used; divinylbenzene is also suitable. Dichlorodialkylsilanes, dialdehydes, such as terephthalaldehyde, and esters, such as ethyl formate or benzoate, are particularly suitable for the dimerization.

Preferred polymer structures are S—B/S—S, X—[—B/S—S]$_2$ and Y—[—B/S—S]$_2$, where the random block B/s it self in turn may be subdivided into blocks B1/S1-B2/S2-B3/S3-.... The random block preferably consists of from 2 to 15, particularly preferably from 3 to 10, random part-blocks. The division of the random block B/S into a very large number of part-blocks Bn/Sn offers the decisive advantage that the B/S block as a whole behaves like a virtually perfect random polymer even in the case of a composition gradient within a part-block Bn/Sn as can be avoided only with difficulty in the anionic polymerization under practical conditions. It is therefore possible to add less than the theoretical amount of Lewis base, which increases the proportion of 1,4-diene linkages, lowers the glass transition temperature Tg and reduces the susceptibility of the polymer to crosslinking. A larger or smaller amount of the part-blocks can be provided with a high diene content. This results in the polymer retaining a residual toughness and not becoming completely brittle even below the glass transition temperature of the predominant B/S blocks.

All the abovementioned weights and volumes are based on the butadiene/styrene monomer combination. However, these data can be readily converted to other monomers technically equivalent to styrene and butadiene.

Block copolymers can be worked up by protonating the carbanions with an alcohol, such as isopropanol, acidifying the reaction mixture, for example with a mixture of $CO_2$ and water, and removing the solvent. The block copolymers may contain antioxidants and antiblocking agents.

From about 0 to 10, in particular from about 0.5 to 5% by weight of hydroxyl-containing polymers of the type comprising the condensates of bisphenols and epichlorohydrin may be used as the polymeric hydroxy compound (component E) in the thermoplastic molding materials. Examples of suitable bisphenols are bisphenol A, B, C, F, S and Z. See also Ullmann's Encyclopedia of Industrial Chemistry, fifth edition, Vol. A 19, p. 349. The condensate of bisphenol A and epichlorohydrin which is sold under the trade name Phenoxy®PKH is preferably used. The hydroxyl-containing compound is furthermore characterized by a viscosity number of from about 20 to 80 ml/g (measured in 0.5% strength $CH_2Cl_2$ solution at 25° C.).

The novel molding materials may also contain conventional additives and processing assistants as component F).

The amount of these additives is in general not more than about 60, preferably not more than about 50, in particular not more than about 30,% by weight, based on the total weight of the components A) to D).

Examples of additives are heat stabilizers, light stabilizers, lubricants, mold release agents and colorants, such as dyes and pigments, in conventional amounts. Further additives are reinforcing agents, such as glass fibers, carbon fibers, aromatic polyamide fibers, and/or fillers, gypsum fibers, synthetic calcium silicates, kaolin, calcinated kaolin, wool astonite, talc and chalk.

Furthermore, lubricants, such as polyethylene wax, are suitable additives.

Carbon blacks and titanium dioxide may be used, for example, as pigments.

When $TiO_2$ is used, the mean particle size is as a rule from about 50 to 400 nm, in particular from about 150 to 240 nm. Rutile and anatase, which if required are coated with metal oxides, e.g. aluminas, silicas or oxides of zinc and siloxanes, are used industrially.

Carbon blacks are to be understood as meaning microcrystalline, finely divided carbons (cf. Kunststofflexikon, 7th edition 1980).

Suitable examples are furnace blacks, acetylene blacks, gas blacks and the thermal blacks obtainable by thermal preparation.

The particle sizes are preferably from about 0.01 to 0.1 $\mu$m and the surface areas are from about $10^2$ to $10^4$ m$^2$/g (BET/ASTM D 3037) and from about $10^2$ to $10^3$ ml/100 g in the case of DBP absorptions (ASTM D 2414).

The novel molding materials are advantageously prepared by mixing the components at from about 230 to 320° C. in a conventional mixing apparatus, such as a kneader, Banbury mixer or single-screw extruder, preferably in a twin-screw extruder. Thorough mixing is necessary for obtaining a very homogeneous molding material. The order in which the components are mixed may be varied; two components or, if required, a plurality of components may be premixed or all components may be mixed together.

The novel molding materials are very suitable for the production of shaped articles of all types. They can furthermore be used for the production of films and semi-finished products by the deep drawing or blow molding method.

Owing to their very good flowability and processing stability, the novel molding materials can be converted, for example by injection molding or extrusion, into moldings which are flame-retardant and have excellent mechanical properties.

The examples which follow illustrate the invention

EXAMPLES

The novel molding materials 1 to 4 are prepared using the components A) to E) listed below and their properties are compared with those of the comparative molding materials V1, V2 and V3.

Component A)

Poly-2,6-dimethyl-1,4-phenylene ether having an average molecular weight ($M_w$) of 40000 g/mol.

Component B$_1$)

High impact polystyrene containing 9% by weight of polybutadiene and having a cellular particle morphology, mean particle size of the soft component of 1 $\mu$m. The VN of the hard matrix was 80 ml/g (0.5% strength in toluene at 23° C.).

Component B$_2$)

High impact polystyrene containing 9% by weight of polybutadiene and having a cellular particle morphology, mean particle size of the soft component of 5 μm. The VN of the matrix was 80 ml/g (0.5 % strength in toluene at 23° C.).

Component $C_1$)
Resorcinol diphenyl phosphate, commercial product Fyrolflex RDP (Akzo).

Component $C_2$)
Triphenylphosphine oxide
Triphenylphosphate (TPPA) was used for comparative experiments.

Component D)
SEPS block rubber, e.g. Kraton G 1650 (Shell AG).

Componente E)
Phenoxy PKH

Preparation of thermoplastic molding materials
The components A) to E) were mixed in a twin-screw extruder (ZSK from Werner & Pfleiderer) at 270° C. and the mixture was extruded, cooled and granulated.

Determination of the properties of thermoplastic molding materials
The dried granules were processed at from 250 to 280° C. to give circular disks, flat bars for the UL 94 test and standard small bars. The damaging energy $W_s$ was determined according to DIN 53 443 at 230° C.

The heat distortion resistance of the samples was determined by means of the Vicat softening temperature, measured according to DIN 53 460, with a force of 49.05 N and a temperature increase of 50 K per hour, using standard small bars.

The flame retardance was determined according to UL 94 using 1/16", thick bars; the combustion times mentioned are the sum of the combustion times of the two flame applications.

The flowability of the molding materials (shearing stability) was determined from the percentage changes in the torque (ΔD) during kneading of the materials in a kneader of the type Haake Theomix 600, the torque after 6 and 26 minutes being compared (kneader temperature 275° C.).

The flowability of the samples was evaluated using the MVI value (DIN 53735) the measurements being carried out at a melt temperature of 275° C. and under a load of 21.6 kg.

The composition and properties of the thermoplastic molding materials prepared are listed in Table 1.

TABLE 1

| Component (% by weight) | Molding material No. | | | | | | |
|---|---|---|---|---|---|---|---|
| | V1 | V2 | V3 | 1 | 2 | 3 | 4 |
| A | 52 | 52 | 52 | 52 | 52 | 52 | 52 |
| $B_1$ | 32 | 32 | 32 | 32.5 | 30.5 | 31 | 31 |
| $B_2$ | — | — | — | — | 2 | 2 | 2 |
| $C_1$ | — | 13 | 6.5 | 6.5 | 6.5 | 8 | 8 |
| $C_2$ | 6.5 | — | — | 6.0 | 6.0 | 4 | 3.5 |
| D | 3 | 3 | 3 | 3 | 3 | 3 | 3 |
| TPPA | 6.5 | — | 6.5 | — | — | — | — |
| E | — | — | — | — | — | — | 0.5 |
| $W_s$ [Nm] | 42 | 32 | 39 | 43 | 47 | 46 | 44 |
| Vicat B [° C.] | 111 | 114 | 112 | 113 | 112 | 115 | 115 |
| UL 94 | V-0 | V-1 | V-0 | V-0 | V-0 | V-0 | V-0 |
| Combustion time [s] | 45 | 66 | 46 | 32 | 33 | 42 | 21 |
| MVI [ml/10'] | 125 | 89 | 103 | 112 | 111 | 106 | 113 |
| ΔD (%) | 26 | 4 | 17 | 9 | 9 | 6 | 5 |

The results of the measurements demonstrate a surprisingly improved property profile for the novel molding materials 1 to 4.

We claim:

1. A flame-retardant thermoplastic molding material containing
   A) at least one polyphenylene ether and
   B) at least one vinyl aromatic polymer, which comprises,
   C) as a flameproofing agent, a mixture of
      $C_1$) at least one oligophosphorus compound selected from compounds of the formula (I) or (II)

$$R^1—O—\overset{O}{\underset{R^2}{P}}—O—\left(—\underset{}{\bigcirc}—O—\overset{O}{\underset{R^2}{P}}—O—\right)_n R^1 \quad (I)$$

$$R^4—O—\overset{O}{\underset{R^3}{P}}—\left(O—\underset{}{\bigcirc}—R^5—\underset{}{\bigcirc}—O—\overset{O}{\underset{R^3}{P}}—O—\right)_p R^4 \quad (II)$$

where
$R^1$ and $R^4$, independently of one another, are each unsubstituted or substituted alkyl or aryl,
$R^2$ and $R^3$, independently of one another, are each unsubstituted or substituted alkyl, aryl, alkoxy or aryloxy,
$R^5$ is alkylene, —$SO_2$—, —CO—, —N=N— or —($R^6$)P(O)—, where
$R^6$ is unsubstituted or substituted alkyl, aryl or alkylaryl, and
n and p, independently of one another, are each from 1.0 to 30,
and
$C_2$) at least one phosphine oxide of the formula (III)

$$R^8—\underset{R^9}{\overset{R^7}{P}}=O \quad (III)$$

where $R^7$, $R^8$ and $R^9$, independently of one another, are each hydrogen or unsubstituted or substituted alkyl, aryl, alkylaryl or cycloalkyl of up to 40 carbon atoms.

2. A molding material as claimed in claim 1, which contains the flameproofing mixture in an amount of from about 1 to about 20% by weight based on the total weight of the material.

3. A molding material as claimed in claim 1, which contains at least one polymeric hydroxy compound in an amount which improves the combustion behavior.

4. A molding material as claimed in claim 1, containing
   A) from about 5 to about 98% by weight of at least one polyphenylene ether,
   B) from about 1 to about 94% by weight of at least one styrene polymer,
   C) from about 1 to about 20% by weight of a flameproofing combination which comprises,
      from about 5 to about 95% by weight, based on the weight of the flameproofing combination, of at least one oligophosphorus compound of the above formula (I) or (II) as component $C_1$
      and
      from about 5 to about 95% by weight, based on the weight of the flameproofing combination, of a phosphine oxide of the above formula (III) as component $C_2$;

D) from 0 to about 50% by weight of at least one impact modifier,

E) from 0 to about 10% by weight of a hydroxyl-carrying polymer and

F) from 0 to about 60% by weight of at least one conventional additive.

5. A molding material as claimed in claim 4, which contains, as the flameproofing combination, a mixture of resorcinol diphenyl phosphate or hydroquinone diphenyl phosphate with triphenylphosphine oxide.

6. A molding material as claimed in claim 1, wherein the oligophosphorus compound and phosphine oxide are present in a molar ratio of from about 1:9 to about 9:1.

7. A molding material as claimed in claim 3, which contains from about 0.5 to about 5% by weight of the hydroxy groups carrying polymeric compound.

8. A molding material as claimed in claim 3, wherein the hydroxy groups carrying polymer compound is the reaction product of a bisphenol and epichlorhydrin.

9. A flame-retardant molding, fiber or film, produced using a 20 molding material as claimed in claim 1.

10. A combination of flame-retardants, comprising a combination of at least one oligophosphorus compound, selected from compounds of the general formula (I) and (II)

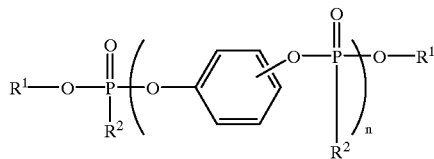

(I)

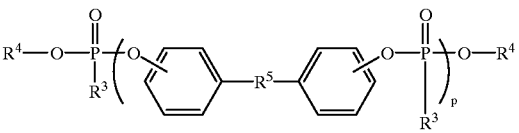

(II)

where
- $R^1$ and $R^4$, independently of one another, are each unsubstituted or substituted alkyl, or aryl,
- $R^2$ and $R^3$, independently of one another, are each unsubstituted or substituted alkyl, aryl, alkoxy or aryloxy,
- $R^5$ is alkylene, —SO$_2$—, —CO—, —N=N— or —($R^6$)P(O)—, where
- $R^6$ is unsustituted or substituted alkyl, aryl or alkylaryl, and
- n and p, independently of one another, are each from 1.0 to 30, and at least one phosphine oxide of the general formula (III)

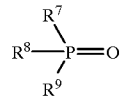

(III)

where $R^7$, $R^8$ and $R^9$ independently of one another, are each hydrogen or unsustituted or substituted alkyl, aryl, alkylaryl or cycloalkyl of up to 40 carbon atoms.

11. A combination of flame-retardants of claim 10, containing the oligophosphorous compound and the phosphine oxide in a molar ratio of about 1:9 to about 9:1.

* * * * *

UNITED STATES PATENT AND TRADEMARK OFFICE
CERTIFICATE OF CORRECTION

PATENT NO.    : 6,194,496
DATED         : February 27, 2001
INVENTOR(S)   : WEBER et al.

It is certified that error appears in the above-identified patent and that said Letters Patent is hereby corrected as shown below:

Col. 3,   line 5,    delete "5".

Col. 3,   line 67,   delete "35".

Col. 7,   line 18,   delete "40".

Col. 8,   line 37,   "1300C" should be -- 130°C --.

Col. 11,  line 23,   "230°C" should be --23°C --

Signed and Sealed this

Fifth Day of June, 2001

*Attest:*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO.    : 6,194,496 B1
DATED         : February 27, 2001
INVENTOR(S)   : Weber et al.

It is certified that error appears in the above-identified patent and that said Letters Patent is hereby corrected as shown below:

<u>Column 13, claim 9,</u>
Line 22, delete "20".

<u>Column 14, claim 10,</u>
Line 30, before "where $R^7$," insert -- as defined in claim 1 --.
Line 31, "unsustituted" should be -- unsubstituted --.

Signed and Sealed this

Nineteenth Day of February, 2002

Attest:

JAMES E. ROGAN
*Attesting Officer*  *Director of the United States Patent and Trademark Office*